United States Patent
Göring

(10) Patent No.: US 7,614,633 B2
(45) Date of Patent: Nov. 10, 2009

(54) ROTOR SYSTEM FOR A BICYCLE

(75) Inventor: Thomas Göring, Karlsruhe (DE)

(73) Assignee: Wolfgang Göring, Karlsruhe (DE)

( * ) Notice: Subject to any disclaimer, the term of this patent is extended or adjusted under 35 U.S.C. 154(b) by 163 days.

(21) Appl. No.: 11/711,508

(22) Filed: Feb. 27, 2007

(65) Prior Publication Data

US 2008/0203697 A1      Aug. 28, 2008

(51) Int. Cl.
    *B62K 19/18* (2006.01)
(52) U.S. Cl. ............. 280/280; 280/279; 280/281.1; 280/264; 188/2; 188/24.11
(58) Field of Classification Search ........... 280/280, 280/279, 281.1, 264; 188/2, 24.11
    See application file for complete search history.

(56) References Cited

U.S. PATENT DOCUMENTS

| | | | | | |
|---|---|---|---|---|---|
| 4,753,448 | A | * | 6/1988 | Nagashima | 280/264 |
| 4,770,435 | A | * | 9/1988 | Cristie | 280/279 |
| 5,443,134 | A | * | 8/1995 | Gajek et al. | 188/344 |
| 5,992,869 | A | * | 11/1999 | Yi-Chen | 280/264 |
| 6,042,495 | A | * | 3/2000 | Patterson et al. | 474/80 |
| 6,224,079 | B1 | * | 5/2001 | Goring | 280/279 |
| 2005/0115777 | A1 | | 6/2005 | Göring | |

FOREIGN PATENT DOCUMENTS

| | | |
|---|---|---|
| DE | 297 08 975 U1 | 7/1997 |
| DE | 200 09 722 U1 | 9/2000 |
| DE | 203 18 558 U1 | 3/2004 |
| DE | 10 2005 034 316 A1 | 2/2007 |
| GB | 2 327 727 A | 2/1999 |

* cited by examiner

*Primary Examiner*—Lesley D. Morris
*Assistant Examiner*—Marlon A Arce
(74) *Attorney, Agent, or Firm*—Womble Carlyle Sandridge & Rice, PLLC

(57) ABSTRACT

In a rotor system, in particular for a bicycle (1), on which a frame (3) bears a fork (8) for the front wheel (10), and a handle bar (18) is connected to the fork (8) by means of a handle stem (14) on a fork shaft (12) of the fork (8), with a first line (52), for a fluid, associated with the handle bar (14), with a second line (55), for a fluid, associated with the frame (3), and a rotor that contains two components (14, 41) that can rotate relative to each other without limits and that, by intimate contact against each other, create a closed fluid connection between the first line (52) attached to one component (14) and the second line (55) attached to the second component (41) in order to transmit the actuation of an actuation mechanism (50) associated with the handle bar (18), the handle stem (14) is one of the two components (14, 41) that can rotate relative to each other without limits and contains at least one chamber (30) included in the fluid connection between the two lines (52, 55).

16 Claims, 2 Drawing Sheets

ROTOR SYSTEM FOR A BICYCLE

TECHNICAL FIELD

The present invention concerns a rotor system, such as for a bicycle, on which the handle bar is connected to a fork for the front wheel, where fork is attached to frame, by means of a handle stem on a fork shaft, with a first line for a fluid associated with the handle bar, with a second line for a fluid associated with frame and a rotor that contains two components that can rotate relative to each other without limits and that, by intimate contact against each other, create a closed fluid connection between the first line attached to one component and the second line attached to the second component in order to transmit the actuation of an actuation mechanism associated with the handle bar.

BACKGROUND OF THE INVENTION

DE 297 08 975 U1 publicizes a rotor system of the type described above, which permits steering movements and rotation of the front wheel of more than 180° without damage to the hydraulic brake system. To do so, a rotor is attached to the fork shaft between the handle stem and the frame, where one component is connected to a brake handle as the brake actuating mechanism by means of a first brake line and a second component, which can rotate with respect to the first component, is attached to a brake on the rear wheel by means of a second brake line, where an actuation of the brake by the brake handle is transmitted to the brake by way of the fluid connection.

BRIEF SUMMARY OF SOME ASPECTS OF THE INVENTION

An aspect of the present invention is the provision of improvements to a rotor system of the type described above. In accordance with one aspect of the present invention, a rotor system, such as for a bicycle, on which the handle bar is connected to a fork for the front wheel, where the fork is attached to the frame, by means of a handle stem on a fork shaft, with a first line for a fluid associated with the handle bar, with a second line for a fluid associated with frame and a rotor that contains two components that (e.g., the rotor comprising first and second components) that can rotate relative to each other without limits and that, by intimate contact against each other, create a closed fluid connection between the first line attached to one component and the second line attached to the second component in order to transmit the actuation of an actuation mechanism associated with the handle bar, characterized by having handle stem as one of the two components that can rotate relative to each other without limits, where handle stem includes at least one chamber included in the fluid connection between the two lines.

Given that one of the components of the rotor that can rotate relative to each other without limits is the handle stem, which contains at least one chamber incorporated in the fluid connection between the two lines, the handle stem is an integral component of the rotor system and provides construction space for the rotor system. Accordingly, less construction space is required between the handle stem and the frame, i.e. between the handle stem and the upper head set of the head tube of the frame. This particular advantageous, if a retrofit is contemplated, because in those cases the fork shaft is already sawed off rather short and the purchase of a new fork is expensive due to the suspension-induced high costs. The savings in construction space makes the rotor system advantageous for mountain bikes or motocross bikes, but it may also be used for other two-wheeled vehicles, such as bicycles, motor bikes and possibly scooters or tricycles and the like. For example, the rotor system may transfer the action of the clutch in motorcycles.

It is preferable that the chamber in the handle stem is contained, at least in segments, within the solid material of a body, where it preferably ends in a bushing upon which a ring as the other component of the rotor is supported and which ends in a connection opening. The ring then preferably contains another chamber, which is semi-open and which surrounds the connection opening like a ring, such that a fluid connection can be achieved with a few, simple to manufacture and thus cheap components.

A further savings in construction space is obtained, if the bushing matches a standard interface on the upper headset, such that one component is not needed and such that the system is covered.

Other aspects and advantages of the present invention will become apparent from the following.

BRIEF DESCRIPTION OF THE DRAWINGS

The invention is explained in more detail in the exemplary embodiment depicted in the drawings. They show.

DETAILED DESCRIPTION OF EXEMPLARY EMBODIMENT

Figure 1:
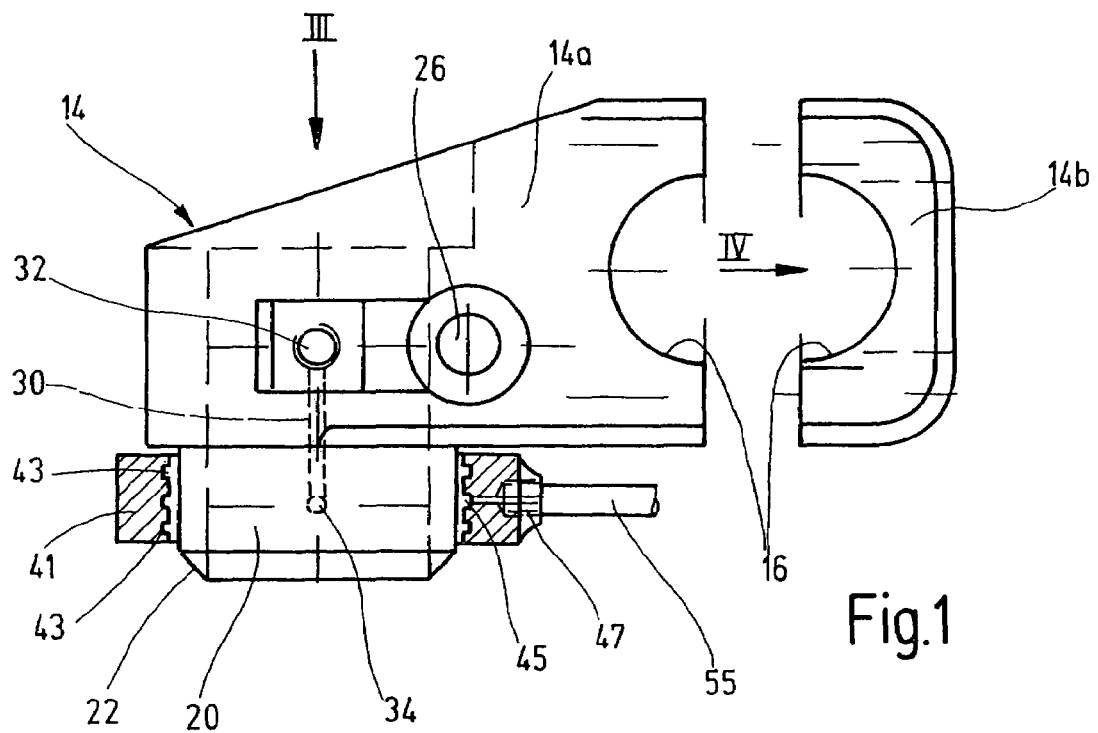
FIG. 1 a right side view of the exemplary embodiment viewed in the direction of travel, FIG. 2 a left side view of a bicycle equipped as specified by the invention, FIG. 3 a top view of the body in the direction of arrow III in FIG. 1, and FIG. 4 an interior view of the lid in the direction of arrow IV in FIG. 1.

Bicycle 1 has a frame 3 that supports rear wheel 5 at the rear of bicycle 1. The upper terminus of frame 3 bears a fork 8 such that it can rotate. Fork 8 bears the front wheel 10 of bicycle 1 on its lower end. Handle stem 14 is firmly attached to fork shaft 12, which forms the upper end of fork 8. Handle stem 14 consists of a body 14a and a lid 14b, which may be screwed into the body, which by means of half-cylindrical recesses in each form a receptacle for a horizontal handle bar receptacle 16 that surrounds the handlebar 18 of bicycle 1. The normal position of handle stem 14 on bicycle 1 determines the directional parameters used below.

The underside of handle stem 14 has a cylindrical bushing 20 that extends below body 14a and that has a chamfered edge 22 at 45° on its free end. Bushing 20 is centrally traversed by a vertical shaft receptacle 24, which extends into body 14a and which is open on the upper side of handle stem 14. Fork shaft 12 is inserted into the traversing shaft receptacle 24, when handle stem 14 is assembled. Handle stem 14 and fork shaft 12 are linked by means of tightener 26 with the aid of wedge segments. The fork with its fork shaft 12 is supported in a head tube of frame 3 by headsets. The upper headset contains a bearing bowl with a 45° cone into which bushing 20 and chamfered edge 22 are inserted to fit, where the lid of the upper headset is no longer needed. This saves the construction space of usually present components and gains construction space for bushing 20 on fork shaft 12, which has been cut to length already.

Inner chamber 30, which traverses segments of body 14a and bushing 20, is designed in the interior of handle stem 14. The upper end of inner chamber 30 extends to an upper connection 32, which has threads in a side extension of body 14a. The lower end of chamber 30 extends to a connection opening 34.

A blind hole is drilled parallel to shaft receptacle 24 and at a distance from the same from above into the solid material to form inner chamber 30 into which two additional blind holes are drilled extending from the upper connection 32 and connection opening 34. After the upper end of the blind hole parallel to shaft receptacle 24 is plugged, inner chamber 30 will have a U-shape overall.

Figure 3:
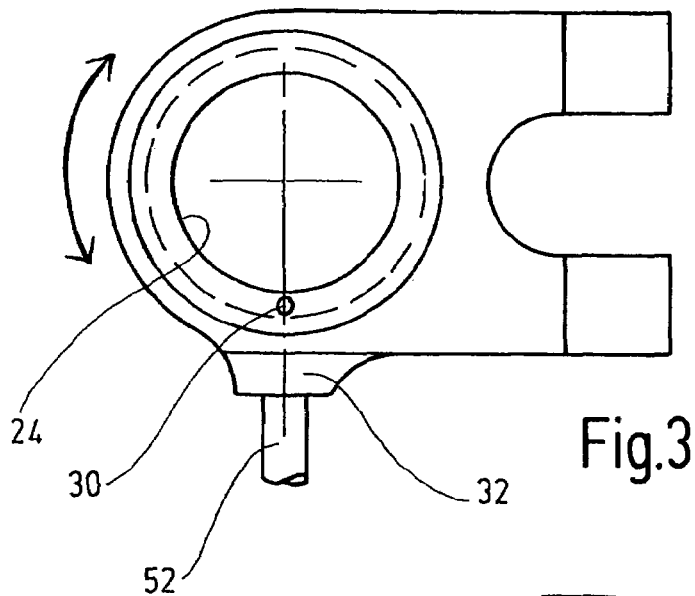
Figure 4:
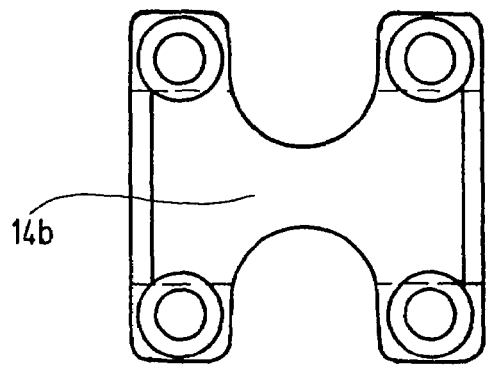
Figure 2:
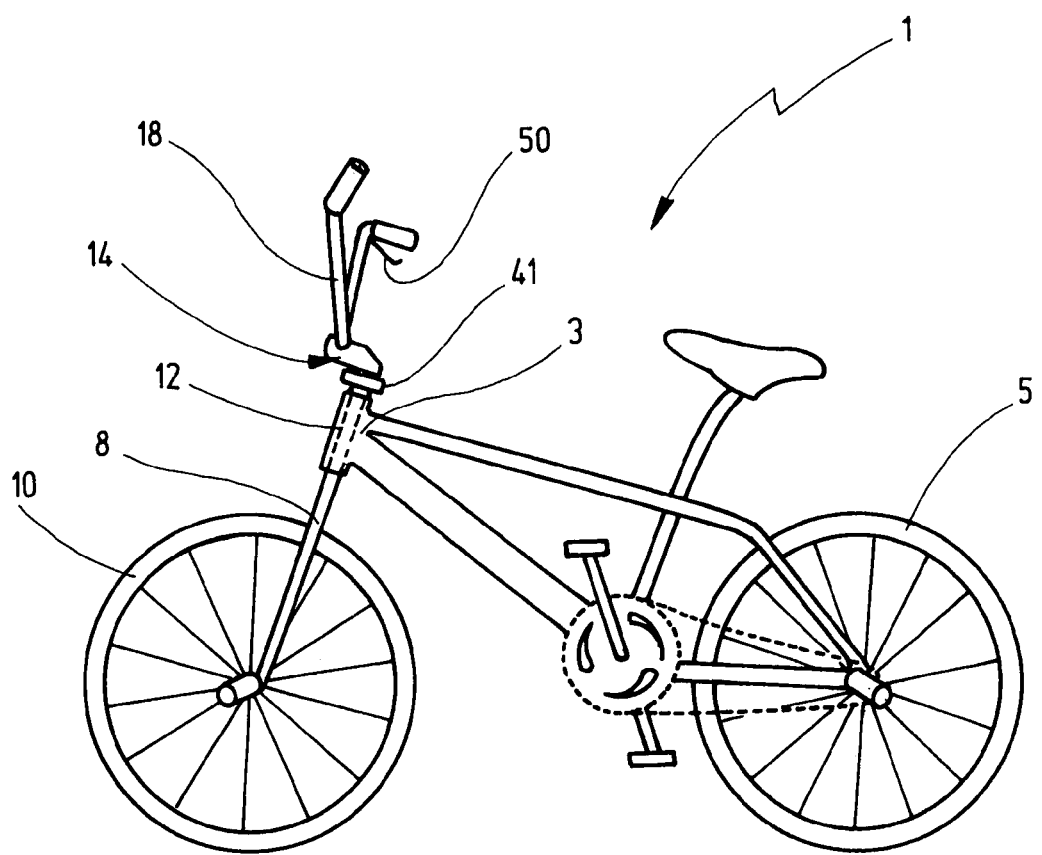

Ring 41 (e.g., a first component) is placed on the outside of bushing 20 (e.g., a second component) such that the ring can turn without limitation (e.g., the turning without limitation is schematically illustrated by the double-ended arrow in FIG. 3), where the inner surface of the ring facing bushing 20 has one gasket receptacle 43 each at the top and at the bottom for an O-ring or a gasket ring with square profile and an outer chamber 45 in between the two receptacles. Gasket receptacles 32 and the outer chamber 45 are both open on the side facing bushing 20. At one point, normally towards the rear, outer chamber 45 connects via a drilled hole to the exterior of ring 41, where a lower connection 45 is included, which likewise has threads in an extension. Handle stem 14 with bushing 20 on the one side and ring 41 (e.g., the first component) with its fluid-tight connection to handle stem 14 (e.g., the second component) on the other side jointly form a rotor.

Two brake handles are attached to the handgrip of handle bar 18 as actuating mechanism 50 for a hydraulic brake system. A fluid-filled first line leads from the first actuating mechanism 50 for a rear wheel brake to upper connection 32 and is connected there, i.e. screwed in. An enclosed fluid connection leads from there via inner chamber 30, connection opening 34 and outer chamber 45 to lower connection 47. A fluid-filled second line 55 leads from lower connection 47, to which the line is attached, to the hydraulically operated brake on rear wheel 5, i.e. actuating mechanism 50 has a fluid connection to the brake on rear wheel 5. A third line leads from the second brake handle through the hollow fork shaft to a brake on front wheel 10.

When the operator of bicycle 1 intends to make a turn, he turns fork 8 and thus front wheel 10 by way of handle bar 18. This turning movement rotates handle stem 14 with bushing 20 by way of handle bar 18, whereas ring 41 remains stationary. The relative turn of bushing 20 and ring 41 maintains the volume in chambers 30 and 45, such that the fluid in the brake system is not moved and the brakes are thus not activated. Given that there are no components to limit the angle of the turn, handle bar 18 may be rotated by more than 360°.

When the user of bicycle 1 wishes to brake, that brake action is initiated for rear wheel 5, when the associated actuating mechanism 50 constricts the fluid in the first line 52, where the pressure is transferred by the fluid through the inner chamber 30 through connection opening 34 and outer chamber 45 to fluid F in the second line 55, such that the brake on rear wheel 5 is eventually activated. Given that the volume of chambers 30 and 45 remains constant during a turning movement, i.e. when bushing 20 and ring 41 are turned, it is feasible to brake with the brake on rear wheel 5 even during a turning movement.

The rotor consisting of handle stem 14 with bushing 20 and ring 41 is linked in this exemplary embodiment to a hydraulic brake system. It could also be linked to a clutch on a motorcycle and could transmit clutch actuation in an analogous manner.

The entire disclosure of DE 10 2005 034 316 A1 is incorporated herein by reference.

LIST OF REFERENCE NUMBERS

1 Bicycle
3 Frame
5 Rear wheel
8 Fork
10 Front wheel
12 Fork shaft
14 Handle stem
14a Body
14b Lid
16 Handle bar receptacle
18 Handle bar
20 Bushing
22 Chamfered edge
24 Shaft receptacle
26 Tightener
30 Inner chamber
32 Upper connection
34 Connection opening
41 Ring
43 Gasket receptacle
45 Outer chamber
47 Lower connection
50 Actuating mechanism
52 First line
55 Second line It will be understood by those skilled in the art that while the present invention has been discussed above with reference to exemplary embodiment(s), various additions, modifications and changes can be made thereto without departing from the spirit and scope of the invention as set forth in the following claims.

What is claimed is:

1. A rotor system for a cycle having a frame that bears a fork for a front wheel, a handle bar connected to the fork by way of a handle stem on a shaft of the fork, an actuation mechanism associated with the handle bar, a first line that is for a fluid and is for being associated with the handle bar, and a second line that is for a fluid and is for being associated with the frame, the rotor system comprising:
    a rotor comprising first and second components that can rotate relative to each other without limits, wherein intimate contact between the first and second components is for creating a closed fluid connection between the first and second lines in order to transmit actuation of the actuation mechanism associated with the handle bar when the first and second lines are respectively attached to the first and second components,
    the handle stem is one of the first and second components that can rotate relative to each other without limits,
    the handle stem includes at least one chamber for being included in the fluid connection between the first and second lines,
    the handle stem has a body with a shaft receptacle, wherein the shaft receptacle is for having the shaft of the fork at least partially inserted into the shaft receptacle,
    the handle stem includes a bushing that extends from the body,
    the shaft receptacle extends through the bushing, and
    a portion of the chamber extends in the bushing to a connection opening of the bushing.

2. The rotor system of claim 1, wherein a segment of the chamber in the handle stem extends in the body to an upper connection for the first line.

3. A rotor system for a cycle having a frame that bears a fork for a front wheel, a handle bar connected to the fork by way of a handle stem on a shaft of the fork, an actuation mechanism associated with the handle bar, a first line that is for a fluid and is for being associated with the handle bar, and a second line that is for a fluid and is for being associated with the frame, the rotor system comprising:

a rotor comprising first and second components that can rotate relative to each other without limits, wherein intimate contact between the first and second components is for creating a closed fluid connection between the first and second lines in order to transmit actuation of the actuation mechanism associated with the handle bar when the first and second lines are respectively attached to the first and second components, the handle stem is one of the first and second components that can rotate relative to each other without limits, the handle stem has a body with a shaft receptacle, wherein the shaft receptacle is for having the shaft of the fork at least partially inserted into the shaft receptacle, the handle stem includes a bushing that extends from the body, the shaft receptacle extends through the bushing, and the bushing is formed onto the body.

4. A rotor system for a cycle having a frame that bears a fork for a front wheel, a handle bar connected to the fork by way of a handle stem on a shaft of the fork, an actuation mechanism associated with the handle bar, a first line that is for a fluid and is for being associated with the handle bar, and a second line that is for a fluid and is for being associated with the frame, the rotor system comprising:

a rotor comprising first and second components that can rotate relative to each other without limits, wherein intimate contact between the first and second components is for creating a closed fluid connection between the first and second lines in order to transmit actuation of the actuation mechanism associated with the handle bar when the first and second lines are respectively attached to the first and second components, the handle stem is one of the first and second components that can rotate relative to each other without limits, the handle stem has a body with a shaft receptacle, wherein the shaft receptacle is for having the shaft of the fork at least partially inserted into the shaft receptacle, the handle stem includes a bushing that extends from the body, the shaft receptacle extends through the bushing, and a lower end of the bushing is fit into a headset on the frame.

5. A rotor system for a cycle having a frame that bears a fork for a front wheel, a handle bar connected to the fork by way of a handle stem on a shaft of the fork, an actuation mechanism associated with the handle bar, a first line that is for a fluid and is for being associated with the handle bar, and a second line that is for a fluid and is for being associated with the frame, the rotor system comprising:

a rotor comprising first and second components that can rotate relative to each other without limits, wherein intimate contact between the first and second components is for creating a closed fluid connection between the first and second lines in order to transmit actuation of the actuation mechanism associated with the handle bar when the first and second lines are respectively attached to the first and second components, the handle stem is one of the first and second components that can rotate relative to each other without limits, the handle stem has a body with a shaft receptacle, wherein the shaft receptacle is for having the shaft of the fork at least partially inserted into the shaft receptacle, and the chamber in the handle stem extends at least in segments parallel to the shaft receptacle.

6. The rotor system of claim 1, wherein the handle stem at least partially defines a handle bar receptacle for supporting the handle bar.

7. The rotor system of claim 6, comprising the handle bar receptacle being formed by the body in conjunction with a lid.

8. The rotor system of claim 1, wherein:

a ring is the other of the first and second components that can rotate relative to each other without limits, so that the handle stem and the ring can rotate relative to each other without limits, the ring is supported by the handle stem, and the ring contains at least one additional chamber for being included in the fluid connection between the first and second lines.

9. The rotor system of claim 8, wherein the chamber of the handle stem is in fluid communication with the chamber of the ring by way of the connection opening of the bushing.

10. The rotor system of claim 8, wherein the chamber of the ring extends to a lower connection for the second line.

11. The rotor system of claim 8, wherein:

the chamber of the ring extends on an interior side of the ring, and the chamber of the ring comprises a semi-circular recess.

12. The rotor system of claim 8, wherein the ring includes:

an upper gasket receptacle that
        is on an interior of the ring,
        is for a gasket ring, and
        is above the chamber of the ring, and
    a lower gasket receptacle that
        is on the interior of the ring,
        is for a gasket ring, and
        is below the chamber of the ring.

13. The rotor system of claim 1 in combination with a bicycle or a tricycle.

14. The rotor system of claim 1, wherein the bushing is formed onto the body.

15. The rotor system of claim 1, wherein the lower end of bushing is fit into a headset on the frame.

16. The rotor system of claim 1, comprising the chamber in the handle stem extending at least in segments parallel to the shaft receptacle.

* * * * *